US006699611B2

United States Patent
Kim et al.

(10) Patent No.: US 6,699,611 B2
(45) Date of Patent: Mar. 2, 2004

(54) FUEL CELL HAVING A THERMO-RESPONSIVE POLYMER INCORPORATED THEREIN

(75) Inventors: Gene Kim, Plantation, FL (US); Ronald J. Kelley, Coral Springs, FL (US); Steven D. Pratt, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 306 days.

(21) Appl. No.: 09/867,015

(22) Filed: May 29, 2001

(65) Prior Publication Data

US 2002/0182464 A1 Dec. 5, 2002

(51) Int. Cl.[7] .......................... H01M 8/04; H01M 8/12; H01M 8/10; H01M 2/14
(52) U.S. Cl. ............................ 429/24; 429/22; 429/30; 429/39
(58) Field of Search ............................ 429/22, 24, 30, 429/39

(56) References Cited

U.S. PATENT DOCUMENTS 5,474,857 A * 12/1995 Uchida et al. ............... 429/33
5,863,395 A    1/1999 Mah et al. ................... 204/252
5,977,241 A * 11/1999 Koloski et al. .............. 524/502

OTHER PUBLICATIONS

Okano T., Yamada N., Okuhara M., Sakai H., and Sakurai Y., "Mechanism of cell detachment from temperature–modulated, hydrophilic–hydrophobic polymer surfaces," Biomaterials 1995, vol. 16, No. 4 297–303 pp. 297–303.

Yoshia M., Asano M., Safranj A., Omichi H., Spohr JV, and Katakai R., Novel Thin Film with Cylindrical Nanopores that Open and Close Depending on Temperature: First Successful Synthesis, Macromolecules 1996, 29. pp. 8987–8989.

* cited by examiner

Primary Examiner—Stephen Kalafut
Assistant Examiner—Julian Mercado
(74) Attorney, Agent, or Firm—Randi L. Karpinia

(57) ABSTRACT

A thermo-responsive polymer is incorporated into a fuel cell (50) in order to maintain optimum hydration of the polymer electrolyte membrane. The thermo-responsive polymer (52) is situated proximate to the membrane electrode assembly (54) such that fuel or oxidant gas passes (56) through the thermo-responsive polymer to the membrane electrode assembly. The thermo-responsive polymer swells or shrinks in response to changes in the operating temperature of the membrane electrode assembly, altering the flow rate of the fuel or oxidant gas passing through the thermo-responsive polymer.

17 Claims, 3 Drawing Sheets

FUEL CELL HAVING A THERMO-RESPONSIVE POLYMER INCORPORATED THEREIN

TECHNICAL FIELD

This invention relates to fuel cells in general, and more particularly, to a system and method for regulating the hydration level of the polymer electrolyte membrane during operation.

BACKGROUND

Fuel cells are electrochemical cells in which a free energy change resulting from a fuel oxidation reaction is converted into electrical energy. The reaction produces only water as a by-product, which has an environmental advantage, and has attracted fuel cells to an enormous potential market for portable energy. A typical fuel cell consists of a fuel electrode (anode) and an oxidant electrode (cathode), separated by an ion-conducting electrolyte. The electrodes are connected electrically to a load (such as an electronic circuit) by external conductors. In these circuit conductors, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. Gaseous hydrogen has become the fuel of choice for most applications, because of its high reactivity in the presence of suitable catalysts and because of its high energy density, and the most common oxidant is gaseous oxygen, which is readily and economically available from the air for fuel cells used in terrestrial applications. The ionic conductivity of the electrolyte is a critical parameter that determines the efficiency and operating condition of a fuel cell. In the case of solid polymer electrolyte membrane (PEM) fuel cells, the combined assembly comprising the PEM, the cathode, and the anode is known as the membrane electrode assembly (MEA).

One major problem associated with a robust fuel cell design is management of water during the operation. In PEM fuel cells, the ionic conductivity of the electrolyte membrane is dependent on the hydration level of the membrane as water molecules are involved in the transport of hydrogen ions across the electrolyte. Typically, fuel cells operate best when fully hydrated and at ambient temperatures, but this can be a tenuous balance. If the by-product water is not removed from the MEA fast enough, the MEA "floods" (too much water generated during fuel cell operation) and the performance of the fuel cell decreases and/or the fuel cell ceases to function. At the other extreme ("drying"—not enough water generated during fuel cell operation), if the PEM is not hydrated enough, the ionic conductivity of the PEM is poor and the transfer rate of ions across the membrane is slow or non-existent, again resulting in poor performance. The problems with maintaining the optimum hydration of the PEM are well known, and many have attempted to solve these problems by various mechanical schemes and by elaborate electronic controls. This is but one of the hurdles that have prevented the widespread adoption fuel cells in the modern world, despite their promise of pollution-free and renewable electricity. A means to control the hydration of the PEM is needed, and may help push the development of a robust fuel cell into product realization.

DETAILED DESCRIPTION OF THE PREFERRED EMBODIMENT

Figure 1:
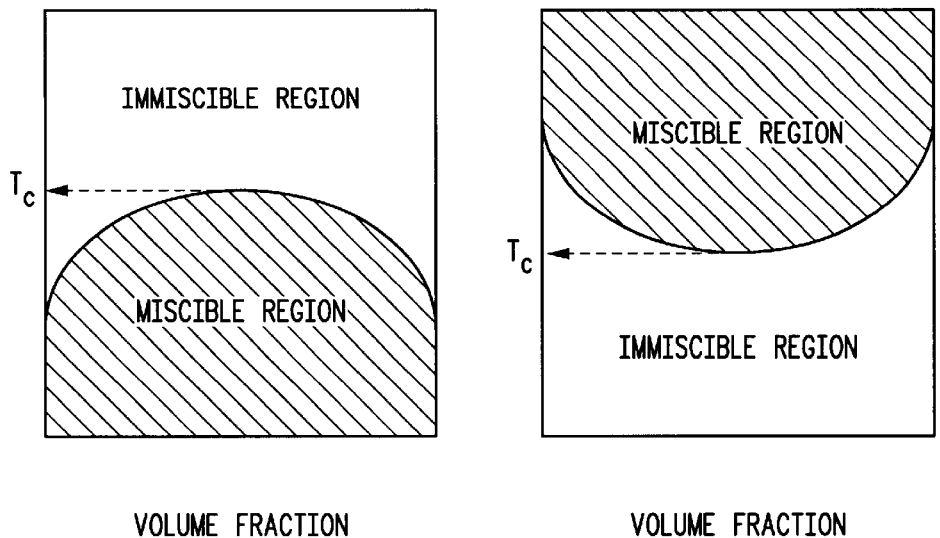
FIG. 1 is a graphic representation of upper critical solution temperature (UCST) (left) and lower critical solution temperature (LCST) (right) behavior of a two-phase material system. $T_c$ denotes the critical temperature where a phase change (between miscible and immiscible) occurs at the volume fraction of the material of interest.

While the specification concludes with claims defining the features of the invention that are regarded as novel, it is believed that the construction, method of operation and advantages of the invention will be better understood from a consideration of the following description in conjunction with the drawing figures. Thermo-responsive polymers can remedy the hydration problem by taking advantage of the increased temperature the fuel cell experiences during operation, and the transition from hydrophobicity to hydrophilicity (and vice versa) upon increasing temperature. A thermo-responsive polymer is incorporated into a fuel cell in order to maintain optimum hydration of the polymer electrolyte membrane. The thermo-responsive polymer is situated proximate to the membrane electrode assembly such that fuel or oxidant gas passes through the thermo-responsive polymer to the membrane electrode assembly. The thermo-responsive polymer swells or shrinks in response to changes in the operating temperature of the membrane electrode assembly, altering the flow rate of the fuel or oxidant gas passing through the thermo-responsive polymer.

Thermo-responsive polymers can be defined as polymers with either an upper critical solution temperature (UCST), or a lower critical solution temperature (LCST). For example, below the LCST, some thermo-responsive polymers are fully hydrated, whereas above the LCST, the polymer becomes dehydrated, aggregates, and precipitates. The opposite behavior is observed for UCST thermo-responsive polymers. That is, above the UCST, the thermo-responsive polymer is fully hydrated, whereas below the UCST, the polymer becomes dehydrated, aggregates, and precipitates. Thus, the amount of water in the PEM can be controlled due to the hydrophilicity and hydrophobicity of the thermo-responsive polymers upon increasing and decreasing temperatures; i.e., UCST (positive) thermo-responsive polymers will become hydrophilic upon increasing temperatures, where LCST (negative) thermo-responsive polymers will become hydrophobic upon increasing temperatures. A graphic representation of a two-phase system (for example, polymer and water) is depicted in FIG. 1. By adding a thermo-responsive polymer to the fuel cell construction, either via attachment of a solid film or porous membrane as a gas diffusion layer, or via incorporation of an interpenetrating polymer network (IPN), or surface functionalization or grafting onto the membrane and/or electrode within the membrane-electrode assembly, the amount of water in the system can be controlled by taking advantage of the change in hydrophilicity and/or hydrophobicity of the thermo-responsive polymer upon change in temperature during fuel cell operation. This contributes to solving the flooding or drying problems during fuel cell operation, and benefits in prolonging the life of a fuel cell via hydrogen and/or oxygen diffusion control.

Polymers that exhibit changes in hydrophobicity in response to increases in temperature are known in biological systems, and have been discussed in the literature. For example, LCST polymers have been used to make a timing layer for use in instant photography that allows uniform processing over a wide temperature range (*Preparation Of Polymers, The Films Of Which Exhibit A Tunable Temperature Dependence To Permeation By Aqueous Solutions*, Lloyd D. Talor, Polymer Preprints, Division of Polymer Chemistry, American Chemical Society, v 39, n 2, Aug. 1998 ACS pp. 754–755). Urry & Hayes reported polymers that exhibited inverse transitions of hydrophobic folding and assembly in response to increases in temperature, and their use in smart functions in biological systems, in *Designing For Advanced Materials By The Delta Tt-Mechanism*, Proceedings of SPIE, The International Society for Optical Engineering v, 2716 Feb. 26–27, 1996, Bellingham, Wash. The design of advanced materials is demonstrated in terms of the capacity to control the temperature, $T_t$, at which the inverse temperature transitions occur by controlling polymer hydrophobicity and by utilizing an associated hydrophobic-induced $pK_a$ shift. A 'smart material' is defined to be one in which the material is responsive to the particular variable of interest, and under the required conditions of temperature, pH, pressure, etc. By the proper design of the polymer, two distinguishable smart functions can be coupled such that an energy input that alters one function causes a change in the second function as an output. To become coupled the two distinguishable functions need to be part of the same hydrophobic folding domain. By way of example, a protein-based polymer was designed to carry out the conversion of electrochemical energy to chemical energy, i.e., electrochemical transduction, under specified conditions of temperature and pH, using the delta $T_t$ mechanism of free energy transduction.

Figure 2:
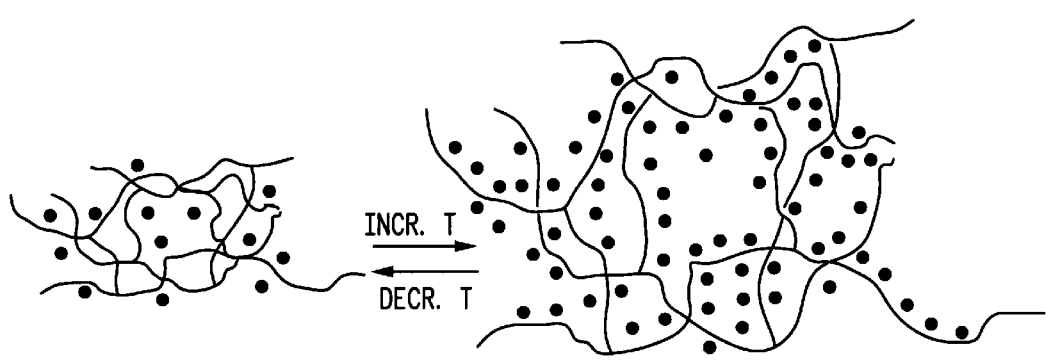
FIG. 2 is a schematic representation of a thermo-responsive interpenetrating polymer network hydrogel with UCST behavior, where the solid and dotted lines denote two different entangled polymers, and the circles denote hydrogen bonded water molecules.

Research has been conducted in positive temperature-sensitive systems for, but not limited to, interpenetrating polymer networks (IPN) composed of poly(acrylic acid) (PAAc) and poly(N,N dimethylacrylamide) (PDMAAm), and PAAc and poly(acryamide-co-butyl acrylate) (poly(Aam-coBMA)) by Aoki et al., and Katono et al. These showed attractive intermolecular polymer-polymer interaction, specifically, the complex formation by hydrogen bonding. The complex formation and dissociation in the IPNs causes reversible shrinking and swelling changes. An illustration of this is shown in FIG. 2.

Poly(vinyl alcohol) (PVA) and PAAc IPNs show the temperature-sensitive hydrogel behavior, and have been reported previously (Yamaguchi et al., Polym. Gels Networks, 1, 247 (1993); Tsunemoto et al., Polymer. Gels Networks, 2, 247 (1994); Ping et al., Polym. Adv. Tech., 5, 320 (1993); Rhim et al., J. Appl. Polym. Sci., 50, 679 (1993)). Recent research has shown that PVA that is heated to dissolve, then frozen and thawed, forms a matrix of physically crosslinked polymeric chain to produce a highly elastic gel (Stauffer et al., Polymer, 33, 3932 (1992)). This PVA gel is stable at room temperature and can be extended to six (6) times its original shape. Properties of PVA gels depend on molecular weight, concentration of aqueous solution, temperature, time of freezing, and number of freeze-thaw cycles. The PVA gel is of particular interest in the biomedical and pharmaceutical field because of the innocuous and non-carcinogenic biocompatibility.

In order to take advantage of these behaviors of thermo-responsive polymers, they can be incorporated with the MEA in a number of ways. These include, among others, incorporating a film of the thermo-responsive polymer between the electrode (anode or cathode) and the polymer electrolyte membrane, as a continuous film or as a porous membrane that is physically or chemically attached; by incorporating the thermo-responsive polymer as an additive into the polymer electrolyte membrane; by modifying the surface (by grafting or surface functionalization) of either the polymer electrolyte membrane or the electrode or both; or by creating a new electrode material or a new polymer electrolyte membrane that contains a thermo-responsive polymer.

Figure 3:
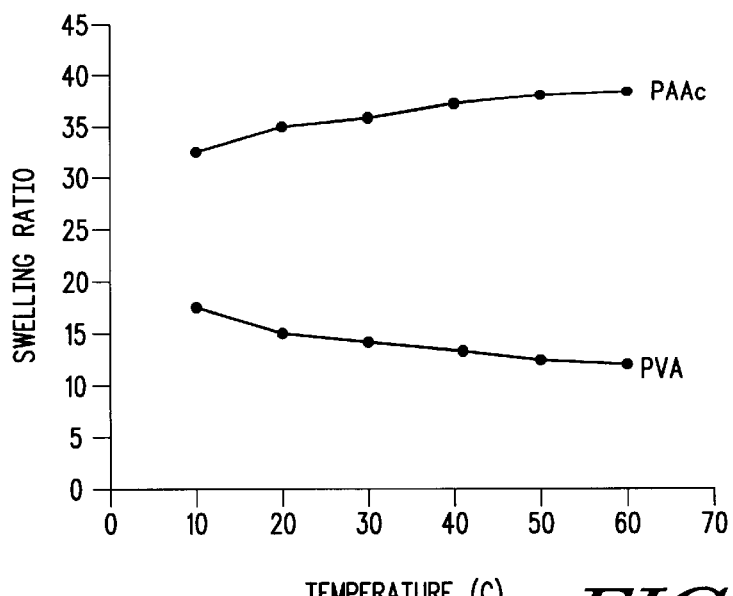
FIG. 3. is a graphic representation of swelling behaviors of two crosslinked homopolymers.

Swelling behaviors of crosslinked homopolymers of PAAc and PVA are shown in FIG. 3. This shows that upon incorporation of the mixture of the two polymers to produce a thermo-responsive IPN, the amount of water in the fuel cell system can be tuned during operation, where the temperature increases and decreases while the device is in use. By incorporating these types of positive thermo-responsive polymer material in, for example, a gas diffusion layer of the fuel cell, the amount of water produced in the membrane-electrode assembly of the operating fuel cell can be controlled. An added benefit to water management by using a positive thermo-responsive gas diffusion layer is the easier path that the thermo-responsive gas diffusion layer creates by allowing more hydrogen and/or oxygen to come through upon expansion; i.e., diffusion of hydrogen and/or oxygen becomes faster upon increasing use of the fuel cell. Construction of the gas diffusion layer can be done either by spin coating the positive thermo-responsive polymer material directly on the MEA, or via physicomechanical attachment (i.e., a separate layer mechanically or adhesively bonded). In either case, a layer of a thermo-responsive polymer is situated proximate to the MEA. By 'proximate to' we mean that the thermo-responsive polymer layer is in intimate contact with, and is at, on, or near the surface of the electrode. Other methods of attachment, such as, but not limited to, grafting via radiation or chemical modification to other polymeric substrates for increased mechanical integrity can be feasible alternatives. Copolymers, terpolymers, and other derivatives with other polymerizable monomers compatible with the thermo-responsive monomers are another means of controlling the architecture of the thermo-responsiveness.

In an alternate embodiment of the invention, a positive thermo-responsive polymer is incorporated directly into the polymer electrolyte membrane as an additive instead of using a separate gas diffusion layer. The same principles apply to production of water during fuel cell operation, by controlling the amount of water by the hydrogen bonding complex mechanism of the IPNs. One advantage in this fabrication is smaller amounts of the thermo-responsive polymer are required. Only a fraction of what would be needed when applied as a continuous film (such as a gas diffusion layer construction) is necessary to tune the water produced during fuel cell operation. An additional benefit is the ability to hinder the diffusion of hydrogen and oxygen in the fuel cell system during operation.

In still another embodiment of the invention, a negative thermo-responsive polymer based on LCST behavior can be used to control the amount of water during fuel cell operation. Contrary to the examples described above, the exact opposite behavior is found when the lower critical solution temperature is reached. Materials that have been studied extensively are poly (N-isopropylacrylamide) (PIPAAm) and poly (vinylmethylether) (PVME), and other custom designed polymers that show negative thermo-responsive behavior have also been reported (Yoshida et al., Macromolecules, 29, 8987 (1996)). Like their positive counterparts, negative thermo-responsive polymers can also be incorporated into the fuel cell as a gas diffusion layer to control the amount of water produced in the membrane-electrode assembly. An added benefit to water management by using a negative thermo-responsive gas diffusion layer is the tortuous path that the thermo-responsive gas diffusion layer creates by allowing less hydrogen and/or oxygen to come through upon contraction; i.e., diffusion of the gas becomes slower upon increasing use of the fuel cell (i.e., as the fuel cell increases in temperature). In one design, the slower diffusion rates result in a fuel cell that operates at a reduced, but steady state, condition for long periods of time, which is beneficial in prolonging the life cycle of a fuel cell, but is not necessarily the maximum performance.

In still another embodiment of the invention, the negative thermo-responsive polymer is incorporated in the polymer electrolyte membrane itself as an additive instead of a gas diffusion layer. Effects similar to those elucidated for the positive thermo-responsive polymer apply for production of water during fuel cell operation, along with the ability to control the amount of water by the hydrogen bonding complex mechanism of the negative thermo-responsive polymers. One advantage in this fabrication is that smaller amounts of negative thermo-responsive polymer are needed. Only a fraction of what would be needed in a continuous film (such as a gas diffusion layer construction) is necessary to tune the amount of water produced during fuel cell operation.

Figure 4:
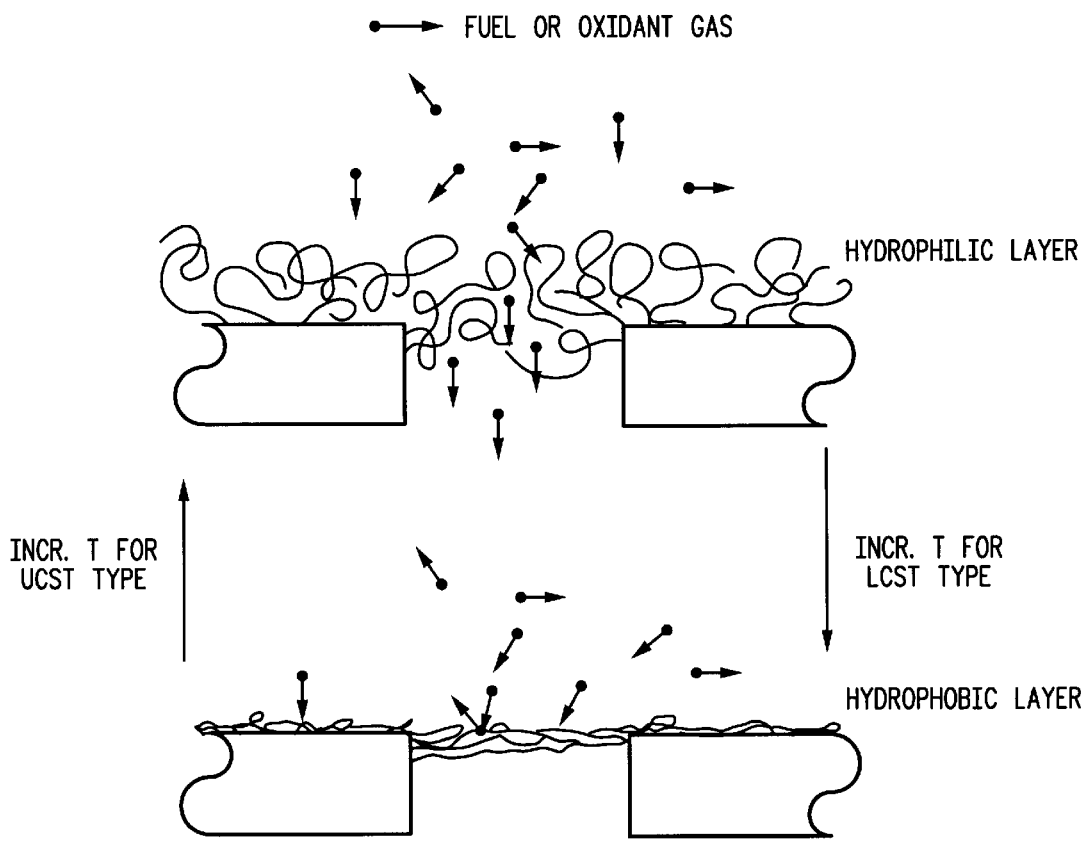
FIG. 4 is a schematic representation of the transition between hydrophilicity and hydrophobicity of thermo-responsive polymers upon increasing and decreasing temperatures, in accordance with the invention.

The behaviors of both the positive and negative thermo-responsive polymers are shown schematically in FIG. 4. The drawing depicts the transition between hydrophilicity and hydrophobicity of the thermo-responsive polymers with increasing and decreasing temperatures, where the chains swell and relax, altering the polymer chain morphology. As the polymer changes, the ability of gas molecules to diffuse through the MEA changes accordingly, depending upon whether the polymer is an UCST or LCST type polymer. Various combinations of the mentioned construction of these different types of thermo-responsive polymers above can also be used to manage water in a fuel cell operation. For example, a negative thermo-responsive polymer film with a positive thermo-responsive polymer additive in the fuel cell system can be used to custom tailor the operation of the fuel cell.

Figure 5:
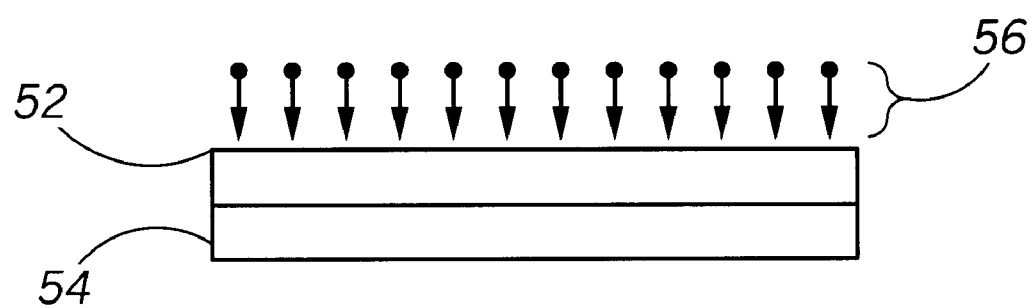
FIG. 5 is a cross-sectional view of a portion of a fuel cell having a layer of thermo-responsive polymer in accordance with one embodiment of the invention.

To summarize, referring now to FIG. 5, by incorporating a thermo-responsive polymer 52 into a fuel cell 50, the optimum hydration of the polymer electrolyte membrane can be maintained. The thermo-responsive polymer 52 is situated proximate to the membrane electrode assembly 54 such that fuel or oxidant gas 56 passes through the thermo-responsive polymer to the membrane electrode assembly. The thermo-responsive polymer swells or shrinks in response to changes in the operating temperature of the membrane electrode assembly, altering the flow rate of the fuel or oxidant gas passing through the thermo-responsive polymer. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method within a fuel cell for hydration management, wherein the fuel cell comprises a positive thermo-responsive polymer situated proximate to a membrane-electrode assembly, the method comprising the steps of:

causing an increased temperature of the fuel cell by operating the fuel cell;

transitioning a positive thermo-responsive polymer from hydrophobicity to hydrophilicity in response to the increased temperature; and controlling the retainment of a water by-product within the fuel cell by increasing a rate of attraction of water within the positive thermo-responsive polymer in response to the transitioning step.

2. A method within a fuel cell for hydration management as recited in claim 1 wherein the water by-product is produced by a reaction between hydrogen and oxygen during the operating of the fuel cell.

3. A method within a fuel cell for hydration management as recited in claim 1 further comprising the step of:

passing a fuel used in the fuel cell through the positive thermo-responsive polymer to control the amount of water produced in a membrane-electrode assembly of the fuel cell.

4. A method within a fuel cell for hydration management, wherein the fuel cell comprises a negative thermo-responsive polymer situated proximate to a membrane-electrode assembly, the method comprising the steps of:

causing an increased temperature of the fuel cell by operating the fuel cell;

transitioning the negative thermo-responsive polymer from hydrophilicity to hydrophobicity in response to the increased temperature; and controlling the rejection of a water by-product in the fuel cell by increasing a rate of repelling of water within the negative thermo-responsive polymer in response to the transitioning step.

5. A method within a fuel cell for hydration management as recited in claim 4 wherein the water by-product is produced by a reaction between hydrogen and oxygen during the operating of the fuel cell.

6. A method within a fuel cell for hydration management as recited in claim 4 further comprising the step of:

passing a fuel used in the fuel cell through the negative thermo-responsive polymer to control the amount of water produced in a membrane-electrode assembly of the fuel cell.

7. A method within a fuel cell for hydration management, wherein the fuel cell comprises a negative thermo-responsive polymer and a positive thermo-responsive polymer each situated proximate to a membrane-electrode assembly, the method comprising the steps of:

causing an increased temperature of the fuel cell by operating the fuel cell;

transitioning the negative thermo-responsive polymer from hydrophilicity to hydrophobicity in response to the increased temperature;

transitioning the positive thermo-responsive polymer from hydrophobicity to hydrophilicity in response to the increased temperature; and controlling the amount of a water by-product within the fuel cell by increasing a rate of attraction of water within the positive thermo-responsive polymer and increasing a rate of repelling of water within the negative thermo-responsive polymer in response to the transitioning step.

8. A method within a fuel cell for hydration management as recited in claim 7 wherein the water by-product is produced by a reaction between hydrogen and oxygen during the operating of the fuel cell.

9. A method within a fuel cell for hydration management as recited in claim 7 further comprising the step of:

passing a fuel used in the fuel cell through the positive thermo-responsive polymer to control the amount of water produced in a membrane-electrode assembly of the fuel cell.

10. A method within a fuel cell for hydration management as recited in claim 7 further comprising the step of:

passing a fuel used in the fuel cell through the negative thermo-responsive polymer to control the amount of water produced in a membrane-electrode assembly of the fuel cell.

11. A fuel cell with hydration management means, the fuel cell comprising:

a membrane electrode assembly comprising:
a fuel electrode,
an oxidant electrode, and
a polymer electrolyte membrane coupled between the fuel electrode and the oxidant electrode; and a negative thermo-responsive polymer situated proximate to the membrane electrode assembly wherein the negative thermo-responsive polymer changes from hydrophilic to hydrophobic upon increasing temperatures, wherein the change of the negative thermo-responsive polymer from hydrophilic to hydrophobic provides control of the amount of water by-product within the fuel cell by increasing a rate of repelling of water within the negative thermo-responsive polymer.

12. A fuel cell as recited in claim 11 wherein a fuel used in the fuel cell passes through the negative thermo-responsive polymer to the membrane electrode assembly for controlling the amount of water produced in the membrane-electrode assembly.

13. A fuel cell as recited in claim 11 wherein the temperature of the fuel cell increases during the operation of the fuel cell.

14. A fuel cell with hydration management means, the fuel cell comprising:

a membrane electrode assembly comprising:
a fuel electrode,
an oxidant electrode, and
a polymer electrolyte membrane coupled between the fuel electrode and the oxidant electrode; and a positive thermo-responsive polymer situated proximate to the membrane electrode assembly wherein the positive thermo-responsive polymer changes from hydrophobic to hydrophilic upon increasing temperatures, wherein the change of the positive thermo-responsive polymer from hydrophobic to hydrophilic provides control of the amount of water by-product within the fuel cell by increasing a rate of attraction of water within the positive thermo-responsive polymer.

15. A fuel cell as recited in claim 14 wherein a fuel used in the fuel cell passes through the positive thermo-responsive polymer to the membrane electrode assembly for controlling the amount of water produced in the membrane-electrode assembly.

16. A fuel cell as recited in claim 14 wherein the temperature of the fuel cell increases during operation of the fuel cell.

17. A fuel cell with hydration management means, the fuel cell comprising:

a membrane electrode assembly comprising:
a fuel electrode,
an oxidant electrode, and
a polymer electrolyte membrane coupled between the fuel electrode and the oxidant electrode;

a negative thermo-responsive polymer situated proximate to the membrane electrode assembly wherein the negative thermo-responsive polymer changes from hydrophilic to hydrophobic upon increasing temperatures; and a positive thermo-responsive polymer situated proximate to the membrane electrode assembly wherein the positive thermo-responsive polymer changes from hydrophobic to hydrophilic upon increasing temperature, wherein the amount of water by-product within the fuel cell is controlled by the change of the negative thermo-responsive polymer from hydrophilic to hydrophobic increasing a rate of repelling of water within the negative thermo-responsive polymer and the change of the positive thermo-responsive polymer from hydrophobic to hydrophilic increasing a rate of attraction of water within the positive thermo-responsive polymer.

* * * * *